March 18, 1941.   A. H. J. DE LASSUS SAINT GENIES   2,235,206
METHOD AND APPARATUS FOR PROJECTING AND FOR COPYING BY PROJECTION
LENTICULAR FILMS IN COLOR OR IN RELIEF
Filed Feb. 4, 1939   2 Sheets-Sheet 1
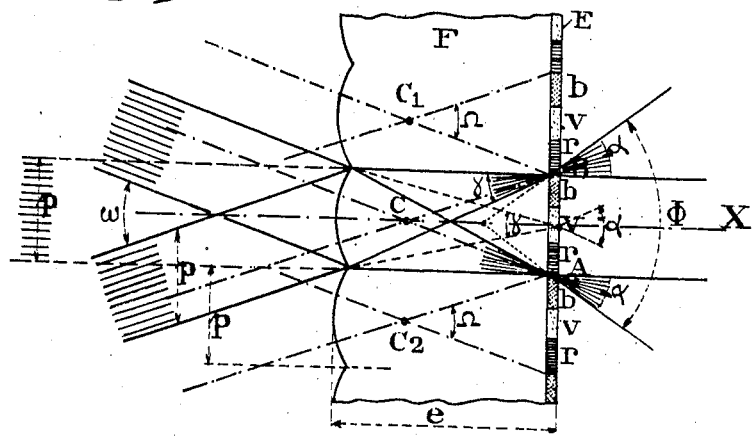
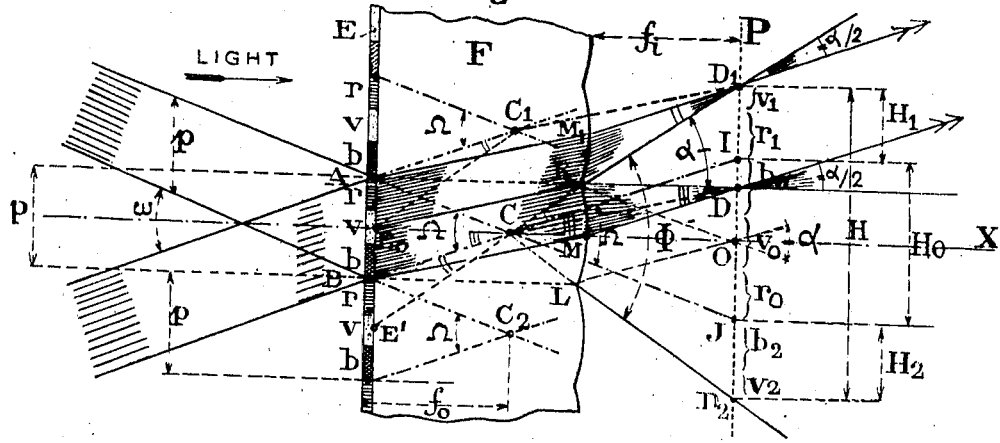
INVENTOR March 18, 1941.  A. H. J. DE LASSUS SAINT GENIES  2,235,206
METHOD AND APPARATUS FOR PROJECTING AND FOR COPYING BY PROJECTION
LENTICULAR FILMS IN COLOR OR IN RELIEF
Filed Feb. 4, 1939    2 Sheets-Sheet 2

INVENTOR.
Anne Henri Jacques
de Lassus Saint Genies.
By Stone, Boyd & ATTORNEYS.

Patented Mar. 18, 1941

2,235,206

UNITED STATES PATENT OFFICE 2,235,206

METHOD AND APPARATUS FOR PROJECTING AND FOR COPYING BY PROJECTION LENTICULAR FILMS IN COLOR OR IN RELIEF

Anne Henri Jacques de Lassus Saint Genies, Versailles, France

Application February 4, 1939, Serial No. 254,708
In France February 11, 1938

6 Claims. (Cl. 88—24)

The present invention relates to improvements in apparatus for projecting, or copying by projection, lenticular films in color or in relief, with a view to improving the light-yield and of ensuring better transmission of their partial (separation) images.

It indicates by way of example particular instances of application, especially to the copying of lenticular films when the lenticulations are facing each other, and to the projection of lenticular films in relief onto special screens with cylindrical optical elements known per se.

Figure 3:
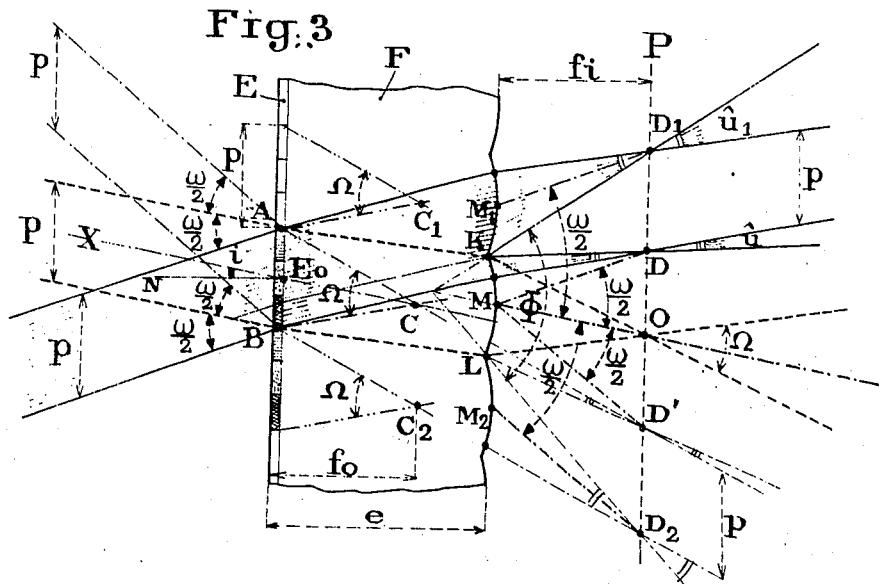

These improvements are based on a study of the exact path of the light rays traversing a lenticular film, as will be explained with reference to the accompanying drawings given by way of example only, in which Fig. 1 shows in section a film, the lenticulations of which face towards the source of light, Fig. 2 illustrates the case in which the lenticulations face towards the projecting objective, only the elementary chamber of the middle section of a film being considered, Fig. 3 illustrates the same case but with respect to the elementary chambers of one of the edges of a film.

Figure 4:
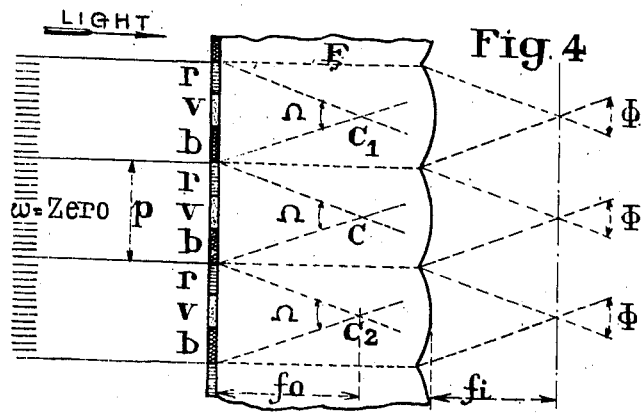

Fig. 4, representing the same case as that shown in Fig. 2, is based on the supposition that the emitting surface of the source of light is viewed at a very small angle—in the neighbourhood of zero.

Figure 5:
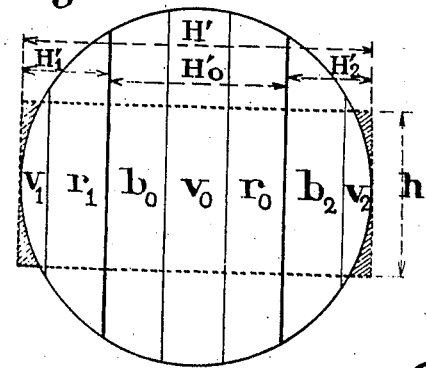

Fig. 5 shows the maximum height which the emitting surface of the source of light may have, as viewed from the film, if a minimum loss of light due to this dimension of the said surface is to be incurred.

Considering, with reference to Fig. 1, an optical element C selected from the series of lenticulations it will now be discussed how this element is illuminated by an emitting or projecting surface of the source of light viewed at an angle $\omega$, and general conclusions will be drawn therefrom with regard to the film in its entirety.

The incident beam proceeding from the emitting surface viewed from C at an angle of $\omega$ may be considered as composed of an infinite number of minute conical beams the apices of which are united on the emitting surface of the light source (not shown), and with their bases on the lenticular face of the breadth $p$, namely the pitch of the lenticulations. Since the distance from the emitting surface is very great relatively to the spacing $p$, these minute beams may be merged, relatively to the film, without error, to form small parallel pencils of rays of a size substantially equal to $p$ in the plane of the drawing.

In a film of thickness $e$ there is traced the path of the central pencil and of the two marginal pencils of rays at a maximum angular distance $\omega$ apart. It will be seen that after refraction by the lenticular surface these pencils of rays become once more conical beams each having an angular aperture amounting to $\gamma$, at the level of the emulsion layer E, and that they emerge again into the air in conical beams having an angular aperture $\alpha$ greater than the angle $\gamma$.

In all that follows it will be assumed, as is in fact almost the case, that the angles such as $\gamma$ and $\alpha$ are constant over the entire extent of the layer E illuminated by one element of the lenticulations and that their size, in the case of each, is that measured for the path of the central pencil of rays.

It will be seen that the extreme lateral rays of the marginal emerging beams form between them an angle $\Phi$ and it may be shown that $$\tan \frac{\Phi}{2}$$

is practically equal to the sum of $$\tan \frac{\omega}{2}$$

and $$\tan \frac{\Omega}{2}$$

$\Omega$ being used to denote the angular aperture of the lenticular element measured at the centre of curvature C of each element, which means that $\Phi$ is substantially greater than either of the angles $\omega$ and $\Omega$; $\alpha$ is substantially equal to $\Omega$ owing to the refractive index of the cellulosic support being in the neighbourhood of 1.5, and owing to the position of the focal plane of the lenticulation coinciding with the plane E.

It should be noted that the same applies for all the optical elements of one and the same film illuminated by the same light source.

In accordance with the usual practice the relative aperture of the projecting lens is generally equal to $\Omega=\alpha$; it follows therefore that under these conditions a large proportion of the light rays after having traversed the film and corresponding substantially to the difference between $\Phi$ and $\Omega$, amounting summarily to $\omega$, is lost.

In order to recover, in the case shown in Fig. 1, all the light rays proceeding from the film it is consequently necessary (both in the case of projection and in the case of copying by projection) in accordance with the present invention, to employ a lens capable of transmitting them without occulation, that is to say, having an effective relative aperture equal to $\Phi$, the maximum angle of spreading of the beams.

In this Fig. 1, as in all that follows, the film under projection is assumed to be arranged between additional lenses in the known manner, that is by "field lenses," not shown in the drawing owing to the impossibility of doing so on account of the excessively enlarged scale on which the lenticulations are shown.

Fig. 2 shows the case in which the lenticulations are disposed facing the projecting objective and in which only the middle region of the film is considered. It is again assumed that the emitting surface of the source of light is viewed at an angle of $\omega$ and that the aperture of the lenticulation is $\Omega$. $f_0$ and $f_1$ denote the equal focal distances of the object or the image focus and each convex elementary lens or lenticulation of the film.

By tracing the course of the central pencil of breadth $p$ based on the elementary image AB recorded by the optical element C in the layer E, it is possible to show again that on emerging, this pencil becomes transformed into a conical beam having an angular aperture amounting in every case to $\alpha$ and substantially equal to $\Omega$, represented by broken lines.

Following one of the marginal pencils of rays it will be seen that it becomes refracted first of all between the points A and B and afterwards on emerging between the corresponding points M and $M_1$ on the curved faces of the two adjacent lenticulations C and $C_1$ in such a manner that the two rays which delimit it before it emerges continue their course through the air parallel to each other towards the objective from these two latter points onwards; but their direction is not generally the same as that of the pencil entering AB (unless M and $M_1$ are at the points of maximum rise of the curved faces under consideration, that is to say, unless $\omega=\Omega$, since the incident ray directed through C, the object node of the lenticulation of microscopic thick lens formed by each optical element of the film such as ABLK, emerges through the point M of maximum rise, namely the image node of this same thick lens). At the point K the pencil $ABMM_1$ may be considered as divided into two partial elementary pencils $E_0BMK$ and $AE_0KM_1$ which, on emerging from the respective adjacent optical elements C and $C_1$, will give rise to conical beams KDM and $KD_1M_1$ which are each substantially equal to $$\frac{\alpha}{2}$$

provided K divides the pencil into two equal fractions. It will also be readily understood with the aid of this figure that the extreme ray $KD_1$ resulting on emerging of the incident marginal pencil of rays under consideration forms the angle $$\frac{\Phi}{2}$$

with the axis CX of the optical element C, and that, being symmetrical on both sides of this axis, the other marginal pencil of incident rays forming the angle $\omega$ with the pencil of rays of which the path has been exactly followed up to now, the total emerging pencil expands, through the illuminated element AB of the layer E, to form the angle $\Phi$ on emergence, so that there is obtained, broadly, the following relation:

$$\tan\frac{\Phi}{2}=\tan\frac{\omega}{2}+\tan\frac{\Omega}{2}$$

If from the point C for example there be made the conical projection of the normal projection filter (or of the pupil in the case of films in relief) in the plane P spaced at the focal distance $f_1$ from the facets of the lenticulation, the projection of this filter occupies the extent IJ equal to $H_0$ in which there are distinguished the normal sequence of color bands $bovoro$, and it will be understood that in the case of the marginal pencil which is refracted as indicated by $ABMM_1$ the normal filter situated in the objective is only traversed by the fraction KDM of the beam of rays emerging through the facet KL and proceeding from this pencil. In the figure this beam KDM with its apex at D is in effect, having regard for the actual size of the lenticulations, capable of being exactly superposed on a beam ICO with the apex C traversing only the region OI of the conical projection $H_0$ of the normal filter, and this region OI corresponds to the zone $E_0B$ of the elementary image considered in the complete image AB and transmitted by this beam KDM.

An incident marginal pencil of rays, illuminating the whole of the image AB, thus only transmits through the lenticular face of this chamber C a part of this image, while the other fraction of the incident pencil of rays emerging in the direction of the beam $KD_1M_1$ is lost. It will be seen in effect that this partial conical beam $KD_1M_1$, being equivalent to the beam $D_1CI$ and practically superposable thereon as regards the actual magnitude of the lenticulation, could not be effectively transmitted by the lenticular face of the adjacent chamber $C_1$ through a region $ID_1$ of an extent $H_1$ considered in the plane P in which the normal filter as seen from C is projected. This region represents visibly the conical projection of an additional fraction of filter which completes the normal filter and which comprises the colors corresponding to those of the monochromes recorded in the zone of the image $AE_0$ transmitted by the beam $KD_1M_1$, or in the zone BE' normally pertaining to the image in the adjacent chamber $C_2$, which may be transmitted by the chamber C just as the portion $AE_0$ is transmitted by the chamber $C_1$.

In accordance with the invention, in order to recover the beam $KD_1M_1$ it is thus necessary to be able to open up the projecting objective to a value equal to $\Phi$ as regards the relative aperture, and to enlarge the filter.

The same considerations, by symmetry relatively to the axis CX of the chamber ABLK lead to an enlargement of the normal filter on a second complementary region of an extent $H_2$ equal to and symmetrical with regard to $H_1$; the color bands distributed in this composite filter, projected conically from the point C in the size H in the plane P, follow one upon the other in the same order as on the normal filter itself.

What has just been said concerning a marginal pencil of rays incident on the central chamber C of the film remains true of any and every pencil of rays of less inclination than this one, almost exactly in the proportion in which this pencil of rays is divided by the points of intersection K or L of adjacent optical elements of the lenticulation.

The above observations and deductions are valid generally for all contiguous elementary images, such as AB, of the layer E, as will be seen with reference to Fig. 3.

When the lenticulations face towards the projecting objective the projection of lenticular films is thus improved, according to the present invention, not only by selecting for the projecting objective the aperture Φ practically equal to ω+Ω but also by assembling with this objective, in the case of color, a composite filter modified according to the representation given in Fig. 2 which throws into relief an enlargement of the normal filter, viewed from the point C in the size $H_0$ in the plane P, until it attains the value in this plane represented by the expression:

$$H = H_0 + H_1 + H_2$$

It is also only on this condition that the projection of the film becomes correct, and, in particular, in the case of colors that the production of any dominant color is prevented. In fact, an examination of the problem of projecting on lenticular film with the normal filter, as commonly employed, shows that a central monochrome becomes dominant.

Fig. 3 shows the transmission of light in an elementary chamber of the lenticular film, the axis of which is oblique to the plane of the gelatin layer, for example in the vicinity of one of the edges of the film.

This figure represents the path of a marginal pencil of rays emanating from the emitting surface of the source of light in one chamber ABLK having its axis CX obliquely disposed and forming the angle $i$ with the normal $NE_0$ to the plane AB of the elementary image.

This case is consequently also, though in a less accentuated manner, the general case with any elementary chamber of a lenticular film such that the distance at which the axes of all its elementary chambers intersect again is finite.

In thick broken lines there is represented, incident to AB, the pencil of rays of the breadth $p$ equal to the pitch of the lenticulation (measured parallel to the gelatin layer E) the direction of which is parallel to the axis XC of the chamber ABLK; in this case, the pencil is inclined at the angle $i$, and passes both through the middle $E_0$ of its elementary image AB and through the centre of curvature C of its lenticular face. This pencil of rays passes, within extremely narrow limits, exactly between the imaginary boundaries AK and BL of this chamber, owing to the inherent properties of the lens, since, seeing that the thick lenticular element ABLK has its nodal points at C (centre of curvature) and M (the point of maximum rise of the lenticular face), the incident ray $XE_0$ is refracted in the direction $E_0M$, that is to say, more or less parallel to AK and BL. This pencil of rays is thus the only one not to go beyond the lenticular face LK of this chamber.

Referring to Fig. 2 this pencil of rays, necessarily emanating from the centre of the emitting surface of the source of light gave rise after traversing the elementary chamber to the only conical pencil of rays emerging undivided, centred exactly on the pupil of entry of the projecting objective viewed at the angle Ω. This has been very properly called the central pencil of rays.

It will be seen from Fig. 3 the pencil of rays, which is parallel to XC at incidence, gives rise on emergence to a conical beam KLO the apex O of which is situated in the plane P at the focal distance $f_1$, on the line MO parallel to XC proceeding from M, the zenith of the lenticulation and the image nodal point of the thick elementary thick lens ABLK. Seeing that this conical beam is for this chamber the only one that is not divided on emerging it must, by reason of symmetry, also be that one which exactly embraces the entrance pupil of the projecting objective, (containing the image of the normal three color filter in the case of lenticular color films) without going beyond it either to one side or the other; it must therefore also be that one which emanates from the centre of the emitting surface of the source of light viewed from the film at an angle ω. This pencil of rays is thus also the central pencil in respect of this elementary chamber.

The two marginal pencils of rays proceeding from the edges of said emitting surface of the source of light form at incidence substantially the same angle $$\frac{\omega}{2}$$

with this first pencil of rays and give rise to the emergence of conical beams divided by the same function of the contiguous faces of lenticulation as was seen in connection with Fig. 2. The directional axes MD and MD' of these emerging beams are substantially symmetrical relatively to the axis MO of the central beam KLO just as the incident pencils of rays which gave rise to them are substantially symmetrical in regard to the incident central pencil of rays. Their extreme rays of maximum deviation form the angle Φ which is the measure of the total spreading of the emerging beam, seeing that always $$\tan \frac{\Phi}{2} = \tan \frac{\omega}{2} + \tan \frac{\Omega}{2}$$

as has been seen above.

This Fig. 3 shows more clearly still that the axis MO of the emerging beam which is parallel to the axis XC of each elementary chamber, is not generally confused with it except in the case of the central chamber of any lenticular film or in the event of collimation. It also shows that in the phenomenon of spreading, everything is substantially symmetrical about the axis XC or MO of the central pencil of rays giving rise to the central emerging beam.

The angles denoted by the same signs in this Fig. 3, are equal angles on the same side of the axis XC or MO or are corresponding angles on opposite sides of this axis and very nearly equal or even practically equal. In actual fact, the angles Ω, ω and $i$ are scarcely half those shown in the figure where they are greatly exaggerated for the sake of clearness of reading as in Fig. 2. It will be seen that in the above case, depicted in the present figure, $û + û_1 = \Omega$, just as with reference to Fig. 2 it was seen that $$2\frac{\alpha}{2} = \Omega$$

It is desirable to point out in connection with Fig. 3 that, since the part of the film represented therein is necessarily remote from the centre of the film and represents preferably the elementary chambers of one of the edges of this film, the direction XC of the central pencil of rays incident on AB is induced to form the angle $i$ with the normal NE to the gelatin layer E only by the intervention of the auxiliary field lens which is situated at the side of the emitting surface of the source of light. Indeed, the purpose of this lens is precisely to produce in a known manner an image of the centre of this radiating surface at the point in space at which the axes such as XC of all the elementary chambers will intersect, that is to say, at the centre of the image carried by the film of the exit pupil of the objective which has served to record it (image of the three color filter used in the case of color film).

It will be understood in consequence that the centre of the emitting surface of the source of light is not (Fig. 3) on an extension of XC but on the extended axis of the central elementary chamber of the film (such as is represented in Fig. 2) and that it only appears to be on the axis XC of each, in respect of all the elementary chambers and particularly in respect of the marginal chambers shown in Fig. 3, owing to the interposition of the auxiliary field lens (not shown and also impossible to show because of the exaggerated scale on which the lenticulations are shown in the drawings).

The other auxiliary lens is likewise not shown, namely that which on the other side of the film gathers together if necessary the axes of the emerging beams intersecting at the centre of the pupil image recorded by this film, to make them intersect the centre of the entrance pupil of the projecting objective (or projection copying objective) in accordance with the known technique.

It will be seen that a projected lenticular film arranged between auxiliary lenses, irrespective of which of its faces is that on which the light is incident, is not capable of giving, in the projecting objective, either one or more whole images of the radiating surface of the source of light overlapping each other, but that owing to an optical phenomenon specifically characteristic of the lenticular film, not to be confused with a phenomenon of diffraction or interference, an image of the emitting surface of the source of light becomes formed which is continuously spread out (expanded) from the centre of this image towards its edges. The brightness of this image diminishes from the centre towards the edges and the total angle $\Phi$ of this spreading out is strictly dependent on the angular aperture $\Omega$ of the lenticular elements and of the film on the angle $\omega$ at which, looking from the film, the radiating surface of the source of light is viewed.

Since projecting objectives are now on the market the useful aperture of which attains a certain maximum value, at the present time approximately f/2, it will be understood that the invention may be applied irrespective of this maximum value, which will be denoted by $\Phi$ from now on, in various ways and particularly in the following:

(a) When, as shown in Fig. 4, the lenticular face of the film faces the objective, and a source of light is used the emitting surface of which is viewed from the plane of the film at an angle $\omega$ which is zero or nearly zero, the angular aperture of the lenticular elements of the film being thus selected substantially equal to the maximum useful aperture $\Phi$ of the lenses known to commerce.

(b) When, with the same orientation of the film, the active surface of the source of light is seen from the plane of the film at an angle $\omega$ other than zero, as indicated in Figs. 2 and 3, it becomes necessary to limit the angular aperture $\Omega$ of the lenticular elements of the film to a value substantially equal to ($\Phi-\omega$) or as nearly equal to this value as possible.

(c) When the film is so arranged that its lenticular surface faces the source of light, the emitting surface of which is seen at an angle of $\omega$, measured from the plane of the film according to Fig. 1, it is necessary to select still another value for $\Omega$ at the most equal to $\omega$ and less than $\Phi$, and such that the relation $\Omega=\Phi-\omega$ is still substantially valid. In the case of lenticular color films there are disposed in the emitting surface of the source of light colored bands, to be normally seen in their totality from the film in the known manner at an angle of $\Omega$, that is to say, bands corresponding to the distribution of the microscopic monochromatic images in the complete elementary image AB; and it is necessary, if there is room to do so to dispose in the emitting surface of the source of light, beyond the surface delimited by this angle $\Omega$ (since $\omega$ is at least equal to $\Omega$ if proper illumination of the film is to be achieved when the lenticulations face the source of light) additional colored bands in the same order as in the normal zone and overlapping it on both sides.

It is also necessary in these various cases to examine what height, measured parallel to the lenticulations of the film, it is desirable that the emitting surface of the source of light should have, according to whether the lenticulations are spherical or cylindrical.

Referring to Fig. 5, depicting a cylindrical lenticulation, this point will be dealt with both for the case in which the source is a source of colored light (lenticulations facing the source of light) and for that in which the source used is one of white light (lenticulations facing the objective) which also applies to films in relief. In the second case it will be seen that it is desirable that the height of the emitting surface of the source of light should not exceed the value which, in the plane containing the circular diaphragm of the projecting objective and possibly also its filter as shown in Fig. 5, gives an image of this surface of a certain maximum height, for example $h$.

This height $h$ is so selected that the inevitable loss of light due to the expansion in the breadth of the beams of an extent amounting to H' does not exceed a desired limit; this loss is virtually that which may be produced by the excess of a rectangle having the sides H' and $h$ over a segment of a height $h$ of the circle of the diameter H' coinciding with the circular diaphragm of the objective, that is to say, that represented by the shaded portions in Fig. 5. It will be seen that this cause of loss due solely to the height of the emitting surface of the source of light measured in a direction parallel to the lenticulations assumed to be cylindrical, can be rendered insignificant. When on the other hand Fig. 5 represents the color bands of the emitting surface of the source of light it will be seen that, relatively to its greater breadth H'$_0$, the height of the emitting surface may for instance likewise be of the order of magnitude of $h$, the circumference of a circle inscribed in the rectangle having the sides H' and $h$ representing on the other hand the projection, at the angle $\Phi$ from the centre of the film, on the plane of the emitting surface of the source of light, of the entrance pupil of the objective itself opened to $\Phi$.

It should be noted that when the lenticulations are spherical, it is necessary to have a source of light viewed at the same very small angle, preferably zero, both in height and in breadth of this source.

In the case in which the source of light is viewed from a lenticular color film at an angle of substantially zero, with the lenticulations facing the objective, it will be understood that the image carried by the film appears in projection bearing the impression of the three color screen lines, clearly visible in the white portions of the projected image. It is demonstrable that this impression is completely effaced, and that in particular the whites appear clean on the projection screen when $$\omega = 2\Omega \text{ and } \Phi = 3\Omega$$

Among other applications of these properties of lenticular films the following may be given by way of example in accordance with the present invention.

Assuming the emitting surface of the source of light to be seen at a minimum angle (with a view to projecting a film with maximum yield of the light flux emanating from this narrow emitting surface) it becomes possible to perfect and simplify the methods of copying by projection disclosed in United States Patent No. 2,135,396 dated November 1, 1938, and United States Patent No. 2,136,327, dated November 8, 1938, and my copending United States Patent No. 2,188,019, dated January 23, 1940, where two movable optically conjugated slots are used for scanning the elementary beams of the film; this simplification and perfecting consists in dispensing with the travelling slot on the side of the original film when the latter is arranged with its lenticulations facing the copying objective.

Figs. 2, 3 and 4 show that provided the angle $\omega$ is very small, for example in the neighborhood of zero (the extreme case being that in which the emitting surface of the source of light appears in the form of a point or a line) the angle formed by the elementary beams on emerging from the film is no less equal to $\Omega$ namely the aperture of the lenticulations, and capable of comprising the entrance pupil of a copying objective having the same aperture $\Omega$, without the danger of any stray ray resulting from a spreading $\Phi > \Omega$ penetrating the said objective to the detriment of the copying. In this way there is thus obtained a copy of extreme purity; this result being achieved with the use merely of slotted screen and moving optical systems only on the side of the copy film, for acting upon the aperture of the elementary beams recorded on this film in all the modes of operation described in the said patent applications.

According to another aspect of the invention, in the case of lenticular films in relief to be projected on special screens having vertically disposed cylindrical optical elements in the conventional manner, it will be understood that moiré effects will be encountered in projecting if the projected film is cylindrically lenticular, again preferably in a vertical sense.

It is known that it would be possible to avoid this disturbance of the projected image by sufficiently tilting the lenticulations of the projected film relatively to the screen; it is also known that it is possible to obtain a correct copy of an original film, of which the lenticulations are preferably vertical, on a copying film of which the lenticulations cross that of the original at an angle of 20 to 30° or more still.

The projection of a film of which the lenticulations are inclined relatively to the direction of the optical elements of special screens of the type referred to above will take place without the slightest moiré effect. However, it cannot take place without distortion in the shape even of the elementary images on this screen unless, as is done in copying with crossed lenticulations, the projecting objective be stopped down greatly to a narrow slot disposed parallel to one of the lines bisecting the two directions of the lenticulations of the film and of the screen respectively. But in this case the light yield of the projection is very considerably diminished, seeing that it would not be at a maximum even if the objective remained at full aperture, on account of the spreading of the beams referred to above.

In applying the present invention there will be projected in relief correctly, and with maximum light yield, a film the lenticulations of which are arranged at an angle of 20 to 30° for example to that of the lenticulated screen, with the aid of a source of light the emitting surface of which has the appearance of a point or of a line, but of sufficiently small height to ensure that in accordance with Fig. 5, the expanded image of this surface of the source of light covers, in the projecting objective the rectangle having the sides $H'$ and $h$ coinciding with the narrow rectangular aperture of the diaphragm disposed in the projecting objective, and disposed transversely to the lenticulations of the projected film.

The term "projecting lenticular films" in the appended claims includes projection in an ordinary cinematograph projector or in a printer.

I claim:

1. Process for avoiding loss of light issuing from lenticular films during the projection thereof due to scattering of the luminous beams by refraction in their lenticular elements, consisting in giving the angle $\Phi$ defining, from the plane of said film, the entrance pupil of the projecting objective a value approximately equal to the sum of the angle $\Omega$ defining, from the plane of said film, the aerial image formed by said film of the exit pupil of the objective used in recording and the angle $\omega$ defining, from the plane of said film, the surface of the source of light.

2. In a method of projecting lenticular films; so arranging the position and area of the emitting surface of the source of light, the position of the film projected and the position of the projecting objective relatively to one another that the angle $\omega$ defining, from the plane of the said film, the emitting surface of the source of light equals approximately the difference between the angle $\Phi$ defining, from the plane of said film, the entrance pupil of the projecting objective and the angle $\Omega$ defining, from the plane of the said film, the aerial image carried by said film of the exit pupil of the objective used for recording.

3. In a method of projecting lenticular color films in which the film projected is arranged between a luminous surface and a projecting objective, with its lenticulated surface facing said objective, said objective containing a color filter; so arranging the luminous surface, the film projected and the objective relatively to one another that the angle $\Phi$ defining, from the plane of said film, the entrance pupil of the projecting objective is approximately equal to the sum of the angle $\Omega$ defining, from the plane of said film, the aerial image formed by said film of the exit pupil of the objective used in recording and the angle $\omega$ defining, from the plane of said film, the emitting surface of the source of light, the objective filter having color bands corresponding to those of the filter used in recording and supplementary color bands on either side of the first mentioned bands, said supplementary bands being of the same size as the first mentioned bands and arranged in the same order of colors.

4. In a method of projecting lenticular films; so arranging the source of light, the film projected and the projecting objective relatively to one another that the angle $\Phi$ defining, from the plane of said film, the entrance pupil of the projecting objective is approximately equal to the sum of the angle $\Omega$ defining, from the plane of said film, the aerial image formed by said film of the exit pupil of the objective used in recording and the angle $\omega$ defining, from the plane of said film, the emitting surface of the source of light, the angle at which is measured parallel to the lenticulations, from the plane of the film, the height of the emitting surface of the source of light being less than the angle $\Phi$ whereby the maximum light yield is obtained from the source of light.

5. In a system of projecting lenticular films, a source of light having an emitting surface, an original film and a projecting objective, said light emitting surface, support and objective being so arranged relatively to one another that the angle $\Phi$ defining, from the plane of said film, the entrance pupil of the projecting objective is approximately equal to the sum of the angle $\Omega$ defining, from the plane of said film, the aerial image formed by said film of the exit pupil of the objective used in recording and the angle $\omega$ defining, from the plane of said film, the emitting surface of the source of light, whereby the maximum light yield is obtained from the source of light.

6. In a system of projecting lenticular films, a source of light having an emitting surface, an original film and a projecting objective, said light emitting surface, support and objective being so arranged relatively to one another that the angle $\Phi$ defining, from the plane of said film, the entrance pupil of the projecting objective is approximately equal to the sum of the angle $\Omega$ defining, from the plane of said film, the aerial image formed by said film of the exit pupil of the objective used in recording and the angle $\omega$ defining, from the plane of said film, the emitting surface of the source of light, the height of the emitting surface of the source of light being less than the angle $\Phi$ whereby the maximum light yield is obtained from the source of light.

ANNE HENRI JACQUES
DE LASSUS ST. GENIES.

CERTIFICATE OF CORRECTION.

Patent No. 2,235,206. March 18, 1941.

ANNE HENRI JACQUES de LASSUS SAINT GENIES.

It is hereby certified that error appears in the printed specification of the above numbered patent requiring correction as follows: Page 2, first column, line 4, for "occulation" read --occultation--; and that the said Letters Patent should be read with this correction therein that the same may conform to the record of the case in the Patent Office.

Signed and sealed this 3rd day of June, A. D. 1941.

(Seal)

Henry Van Arsdale,
Acting Commissioner of Patents.